(12) United States Patent
Abbas et al.

(10) Patent No.: US 12,572,923 B2
(45) Date of Patent: Mar. 10, 2026

(54) SYSTEM AND METHOD FOR COMPUTER NETWORK SELECTION

(71) Applicant: The Toronto-Dominion Bank, Toronto (CA)

(72) Inventors: Mohamed Abbas, Jersey City, NJ (US); Alisha Romer, Blackwood, NJ (US)

(73) Assignee: The Toronto-Dominion Bank, Toronto (CA)

( * ) Notice: Subject to any disclaimer, the term of this patent is extended or adjusted under 35 U.S.C. 154(b) by 223 days.

(21) Appl. No.: 18/328,088

(22) Filed: Jun. 2, 2023

(65) Prior Publication Data

US 2024/0403862 A1 Dec. 5, 2024

(51) Int. Cl.
*G06Q 20/36* (2012.01)
*G06Q 20/38* (2012.01)

(52) U.S. Cl.
CPC ....... *G06Q 20/3672* (2013.01); *G06Q 20/382* (2013.01)

(58) Field of Classification Search
CPC .... G06Q 20/36; G06Q 20/38; G06Q 20/3672; G06Q 20/382
See application file for complete search history.

(56) References Cited

U.S. PATENT DOCUMENTS

| | | | |
|---|---|---|---|
| 9,652,770 B1 | 5/2017 | Kurani et al. | |
| 11,080,701 B2 | 8/2021 | Scott et al. | |
| 11,423,384 B1 * | 8/2022 | Philbrick | ............... G06Q 10/10 |
| 11,423,393 B1 | 8/2022 | Kurani | |

(Continued)

FOREIGN PATENT DOCUMENTS

| | | |
|---|---|---|
| GB | 2505382 A | 2/2014 |
| JP | 6152185 B1 | 6/2017 |

(Continued)

*Primary Examiner* — Scott S Trotter

(74) *Attorney, Agent, or Firm* — Rowand LLP

(57) ABSTRACT

A server computer system comprises a communications module; at least one processor coupled to the communications module; and a memory coupled to the at least one processor, the memory storing processor-executable instructions which, when executed by the at least one processor, configure the at least one processor to detect a trigger condition based at least on client device data; identify at least one available computer network for performing one or more operations based at least on the client device data; send, via the communications module, a notification for output on a display of a client device, the notification presenting a selectable option for selecting the at least one available computer network; receive, via the communications module and from the client device, an indication of selection of the selectable option for selecting the at least one available computer network; generate a digital token for communicating instructions to perform one or more operations using the at least one available computer network; and provision the client device with the digital token to enable the client device to selectively communicate instructions to perform the one or more operations using the at least one available computer network. Machine learning may be used to identify the at least one available computer network.

20 Claims, 8 Drawing Sheets

(56) References Cited

U.S. PATENT DOCUMENTS

| | | | | |
|---|---|---|---|---|
| 11,501,217 B2 * | 11/2022 | Mullen | .............. | G06Q 20/3278 |
| 2016/0012465 A1 | 1/2016 | Sharp | | |
| 2018/0150829 A1 | 5/2018 | Kadam | | |
| 2019/0320383 A1 * | 10/2019 | Gardner | .............. | H04W 64/006 |
| 2020/0097955 A1 * | 3/2020 | Gandhi | .................... | G06N 3/08 |
| 2020/0134605 A1 | 4/2020 | Grant et al. | | |
| 2021/0117965 A1 * | 4/2021 | Venot | .................... | G06Q 20/36 |
| 2021/0133732 A1 | 5/2021 | Alumbaugh et al. | | |
| 2021/0241267 A1 * | 8/2021 | Mahajan | ............ | G06Q 20/4093 |
| 2022/0358487 A1 * | 11/2022 | Garner | .............. | G06Q 20/3574 |

FOREIGN PATENT DOCUMENTS

| | | | |
|---|---|---|---|
| KR | 1020160116613 A | 10/2016 | |
| WO | 2014108762 A2 | 7/2014 | |

* cited by examiner

100

120

110

300

500

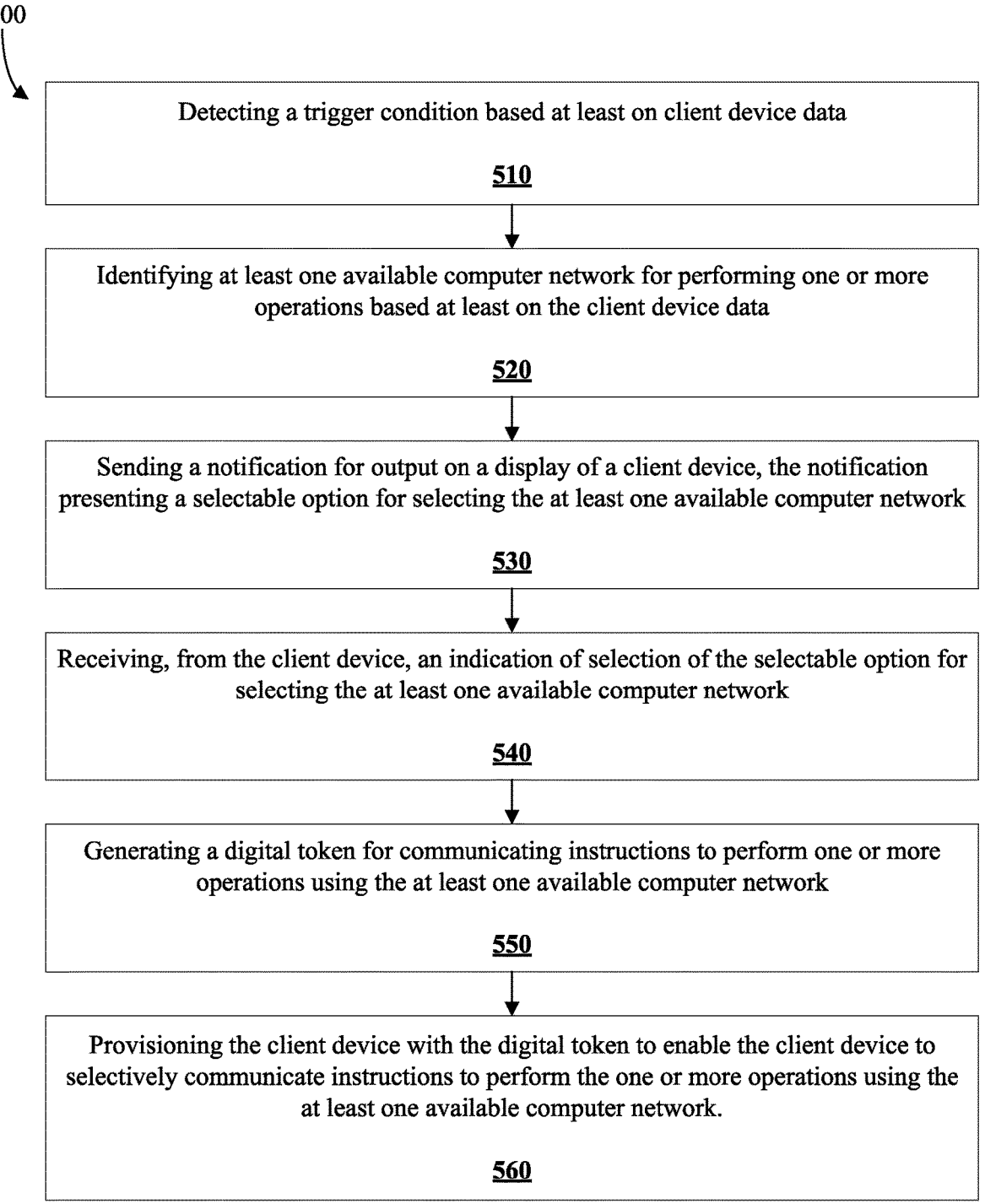

Detecting a trigger condition based at least on client device data

510

Identifying at least one available computer network for performing one or more operations based at least on the client device data

520

Sending a notification for output on a display of a client device, the notification presenting a selectable option for selecting the at least one available computer network

530

Receiving, from the client device, an indication of selection of the selectable option for selecting the at least one available computer network

540

Generating a digital token for communicating instructions to perform one or more operations using the at least one available computer network

550

Provisioning the client device with the digital token to enable the client device to selectively communicate instructions to perform the one or more operations using the at least one available computer network.

SYSTEM AND METHOD FOR COMPUTER NETWORK SELECTION

TECHNICAL FIELD

The present application relates to systems and methods for computer network selection.

BACKGROUND

Different computer networks may be available to perform an operation. Often, the computer network selected to perform the operation may not be the best available computer network.

BRIEF DESCRIPTION OF THE DRAWINGS

Embodiments are described in detail below, with reference to the following drawings:

FIG. 5 is a flowchart showing operations performed by a server computer system for computer network selection according to an embodiment;

Like reference numerals are used in the drawings to denote like elements and features.

DETAILED DESCRIPTION OF VARIOUS EMBODIMENTS

Figure 1:
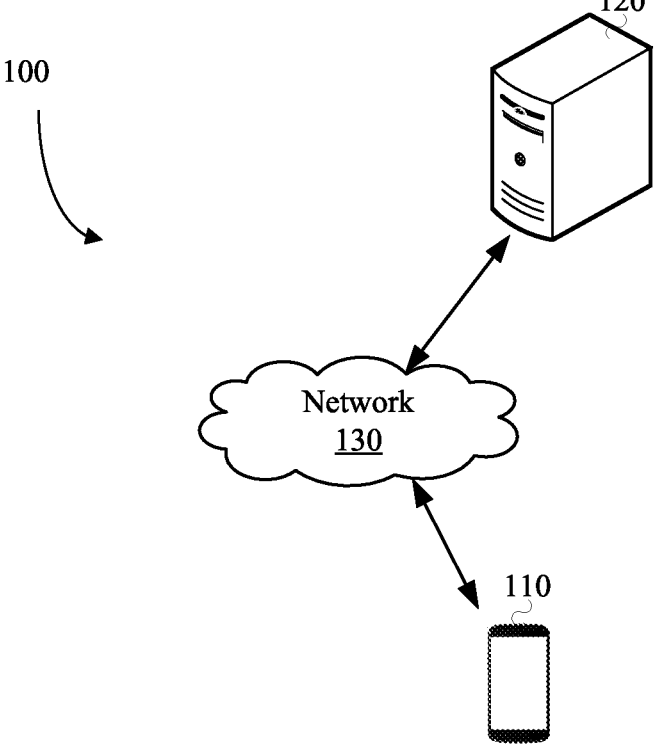
FIG. 1 is a schematic operation diagram illustrating an operating environment of an example embodiment.

Accordingly, in one aspect there is provided a server computer system comprising a communications module; at least one processor coupled to the communications module; and a memory coupled to the at least one processor, the memory storing processor-executable instructions which, when executed by the at least one processor, configure the at least one processor to detect a trigger condition based at least on client device data; identify at least one available computer network for performing one or more operations based at least on the client device data; send, via the communications module, a notification for output on a display of a client device, the notification presenting a selectable option for selecting the at least one available computer network; receive, via the communications module and from the client device, an indication of selection of the selectable option for selecting the at least one available computer network; generate a digital token for communicating instructions to perform one or more operations using the at least one available computer network; and provision the client device with the digital token to enable the client device to selectively communicate instructions to perform the one or more operations using the at least one available computer network.

In one or more embodiments, the client device data includes geolocation data.

In one or more embodiments, the instructions, when executed by the at least one processor, further configure the at least one processor to determine the trigger condition based, at least in part, on determining that the geolocation data identifies a change in location of the client device.

In one or more embodiments, the instructions, when executed by the at least one processor, further configure the at least one processor to perform a lookup using the client device data to identify the at least one available computer network.

In one or more embodiments, the instructions, when executed by the at least one processor, further configure the at least one processor to provision a digital wallet resident on the client device with the digital token.

In one or more embodiments, the at least one available computer network includes at least one payment network.

In one or more embodiments, the digital token includes a temporary digital token.

In one or more embodiments, the digital token is only available to communicate the instructions to perform the one or more operations using the at least one available computer network when the trigger condition is satisfied.

In one or more embodiments, the instructions, when executed by the at least one processor, further configure the at least one processor to continuously obtain the client device data; determine, based on the client device data, that the trigger condition is no longer satisfied; and responsive to determining that the trigger condition is no longer satisfied, disable the digital token on the client device such that the digital token cannot communicate the instructions to perform the one or more operations.

In one or more embodiments, the instructions, when executed by the at least one processor, further configure the at least one processor to detect at least another trigger condition based at least on the client device data; identify at least one different available computer network for performing one or more operations based at least on the client device data; send, via the communications module, a notification for output on the display of the client device, the notification presenting a selectable option for selecting the at least one different available computer network; receive, via the communications module and from the client device, an indication of selection of the selectable option for selecting the at least one different available computer network; generate a digital token for communicating instructions to perform one or more operations using the at least one different available computer network; and provision the client device with the digital token to enable the client device to selectively communicate instructions to perform the one or more operations using the at least one different available computer network.

In one or more embodiments, the trigger condition includes identifying a first geolocation of the client device and the at least another trigger condition includes identifying a second geolocation of the client device that is different than the first geolocation.

In one or more embodiments, when generating the digital token, the instructions, when executed by the at least one processor, further configure the at least one processor to generate a tokenized primary account number for the digital token.

In one or more embodiments, the instructions, when executed by the at least one processor, further configure the at least one processor to analyze the client device data to identify a geolocation of the client device; determine a foreign currency based on the geolocation of the client device; and identify the at least one available computer network based on the foreign currency.

According to another aspect there is provided a computer-implemented method comprising detecting a trigger condition based at least on client device data; identifying at least one available computer network for performing one or more operations based at least on the client device data; sending a notification for output on a display of a client device, the notification presenting a selectable option for selecting the at least one available computer network; receiving, from the client device, an indication of selection of the selectable option for selecting the at least one available computer network; generating a digital token for communicating instructions to perform one or more operations using the at least one available computer network; and provisioning the client device with the digital token to enable the client device to selectively communicate instructions to perform the one or more operations using the at least one available computer network.

In one or more embodiments, the client device data includes geolocation data and the method further comprises determining the trigger condition based, at least in part, on determining that the geolocation data identifies a change in location of the client device.

In one or more embodiments, the method further comprises performing a lookup using the client device data to identify the at least one available computer network.

In one or more embodiments, the digital token is only available to communicate the instructions to perform the one or more operations using the at least one available computer network when the trigger condition is satisfied.

In one or more embodiments, the method further comprises continuously obtaining the client device data; determining, based on the client device data, that the trigger condition is no longer satisfied; and responsive to determining that the trigger condition is no longer satisfied, disabling the digital token on the client device such that the digital token cannot communicate the instructions to perform the one or more operations.

In one or more embodiments, the method further comprises detecting at least another trigger condition based at least on the client device data; identifying at least one different available computer network for performing one or more operations based at least on the client device data; sending a notification for output on the display of the client device, the notification presenting a selectable option for selecting the at least one different available computer network; receiving, from the client device, an indication of selection of the selectable option for selecting the at least one different available computer network; generating a digital token for communicating instructions to perform one or more operations using the at least one different available computer network; and provisioning the client device with the digital token to enable the client device to selectively communicate instructions to perform the one or more operations using the at least one different available computer network.

According to another aspect there is provided a non-transitory computer readable storage medium comprising computer-executable instructions which, when executed, configure at least one processor to detect a trigger condition based at least on client device data; identify at least one available computer network for performing one or more operations based at least on the client device data; send, via a communications module, a notification for output on a display of a client device, the notification presenting a selectable option for selecting the at least one available computer network; receive, via the communications module and from the client device, an indication of selection of the selectable option for selecting the at least one available computer network; generate a digital token for communicating instructions to perform one or more operations using the at least one available computer network; and provision the client device with the digital token to enable the client device to selectively communicate instructions to perform the one or more operations using the at least one available computer network.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

In the present application, various functionalities discussed herein may be performed by a single processor or by any one of one or more processors, either alone or in combination.

Travel to foreign countries often means traveling to a jurisdiction in which your home currency is not the currency in use. Different computer networks may be available to complete transactions in the jurisdiction. For example, computer networks such as for example VISA™, Mastercard™, or American Express™ payment networks or payment rails may be available, however the exchange rate to convert a foreign currency purchase into a traveler's home currency may be disadvantageous and costly.

Accordingly, it would be advantageous to provide for systems and methods to avoid a disadvantageous exchange rate. Implementation of such a system or method raises the issue of how and when to identify a traveler in need of foreign currency conversion and how and when to determine what computer network should be used for the foreign currency conversion.

In one aspect of the present application, methods and systems are described for provisioning a client device with a digital token that enables the client device to selectively communicate instructions to perform one or more operations using a particular computer network. The methods and systems do this by detecting a trigger condition based on client device data and identifying at least one available computer network for performing one or more operations based on the client device data. The methods and systems send a notification to the client device that presents a selectable option for selecting the particular computer network and, responsive to receiving an indication of selection of the selectable option, generate the digital token.

FIG. 1 is a schematic operation diagram illustrating an operating environment of an example embodiment. As shown, the system 100 includes a client device 110 and a server computer system 120 coupled to one another through a network 130, which may include a public network such as the Internet and/or a private network. The client device 110 and the server computer system 120 may be in geographically disparate locations. Put differently, the client device 110 and the server computer system 120 may be located remote from one another.

The client device 110 may be a smartphone as shown in FIG. 1. However, the client device 110 may be a computing device of another type such as for example a laptop computer, a personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The client device 110 may generate client device data and the client device data may include, for example, a geolocation of the client device 110, a list of applications installed on the client device 110, application data from one or more of the applications installed on the client device 110, etc.

The server computer system 120 may be an application server. The mobile application may be resident on the client device 110 and may allow the server computer system 120 to communicate with the client device 110. For example, the mobile application may present one or more graphical user interfaces on a display screen of the client device 110 that may allow the server computer system 120 to communicate with the client device 110.

The server computer system 120 may additionally or alternatively be a financial institution server and may maintain a database that includes various data records. At least some of the data records may be associated with customer bank accounts. For example, a data record may store resource data that may reflect an amount of resources stored in a customer's bank account. At least some of the data records may include additional account data such as for example the name, age, address of the customer, etc. and the account data may be associated with the customer bank accounts. The server computer system 120 may obtain client device data from the client device 110 and may identify one or more available computer networks for performing one or more operations based on the client device data.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

Figure 2:
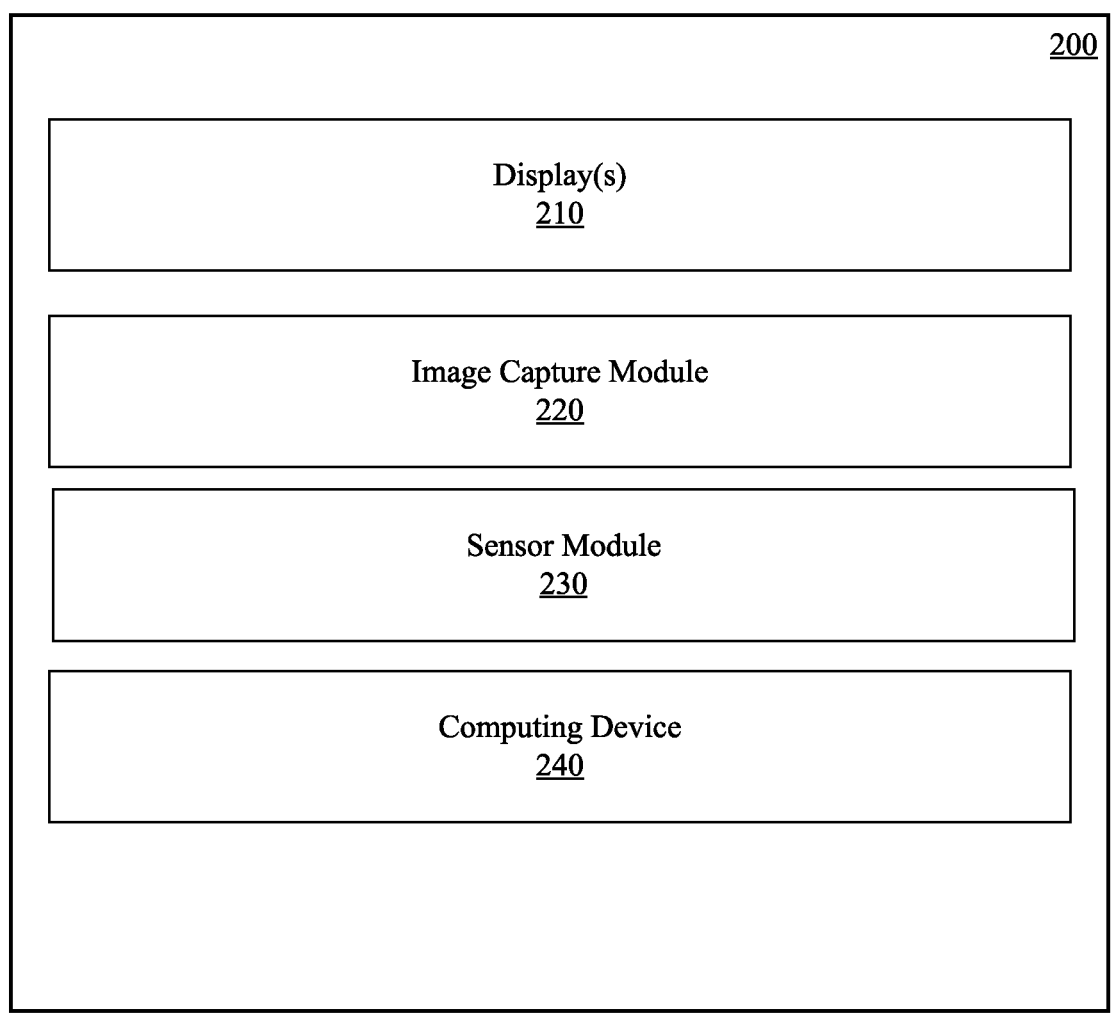
FIG. 2 is a simplified schematic diagram showing components of a computing device.

FIG. 2 is a simplified schematic diagram showing components of an exemplary computing device 200. The client device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates geolocation data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
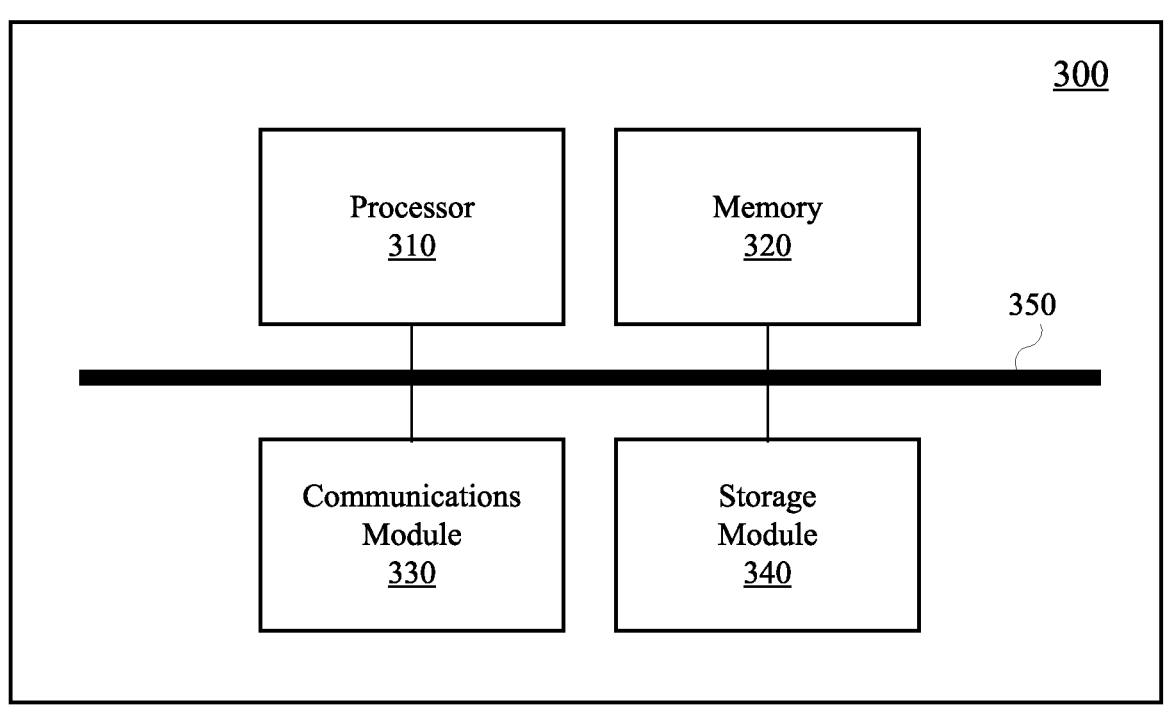
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2) and/or the server computer system 120.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
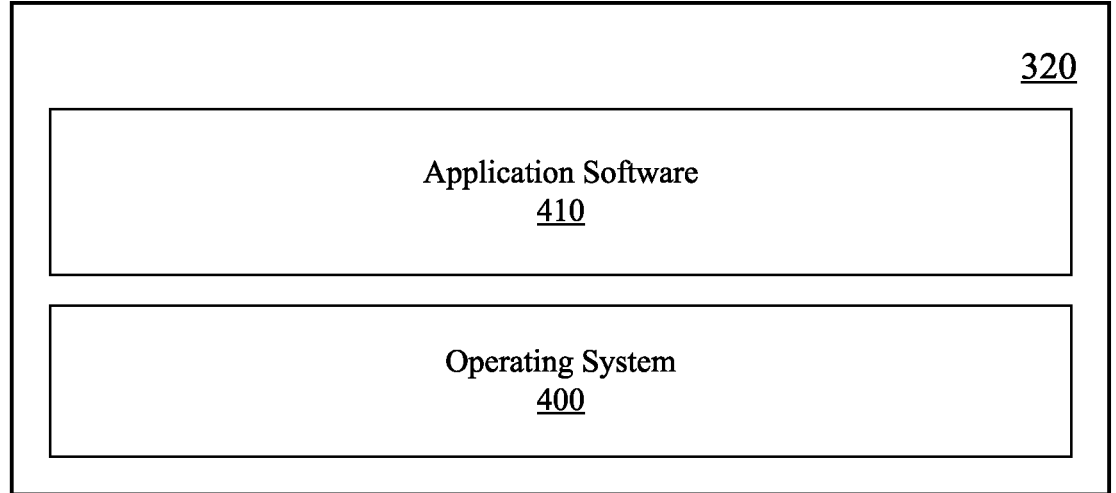
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2) and/or the server computer system 120.

While a single application 410 is illustrated in FIG. 3, in operation the memory 320 may include more than one application 410 and different applications 410 may perform different operations. For example, in at least some embodiments in which the computer device 300 is functioning as the client device 110, the applications 410 may include a banking application. The banking application may be configured for secure communications with the server computer system 120 and may provide various banking functions such as, for example, the ability to display a quantum of value in one or more transfer records (e.g. display balances), configure transfers of data (e.g. bill payments and other transfers), and account management functions. The mobile banking application may allow a user to provision the client device with a digital token to enable the client device to selectively communicate instructions to perform one or more operations using a particular computer network.

By way of further example, in at least some embodiments in which the computer device 300 functions as the client device 110, the applications 410 may include a web browser, which may also be referred to as an Internet browser. In at least some such embodiments, the server computer system 120 may be a web server that may serve one or more of the graphical user interfaces described herein. The web server may cooperate with the web browser and may serve as an interface when the interface is requested through the web browser. For example, the web browser may serve as a mobile or online banking interface. The mobile banking interface may provide various banking functions such as, for example, the ability to display a quantum of value in one or more transfer records (e.g. display balances), configure transfers of data (e.g. bill payments and other transfers), and account management functions. The mobile banking application may allow a user to provision the client device with a digital token to enable the client device to selectively communicate instructions to perform one or more operations using a particular computer network.

Reference is made to FIG. 5, which illustrates, in flowchart form, a method 500 for computer network selection. The method 500 may be implemented by a computing device having suitable processor-executable instructions for causing the computing device to carry out the described operations. The method 500 may be implemented, in whole or in part, by the server computer system 120. It will be appreciated that some of the operations may be offloaded to the client device 110.

The method 500 includes detecting a trigger condition based at least on client device data (step 610).

In one or more embodiments, the client device data may be communicated to the server computer system 120 from the client device 110. For example, the server computer system 120 may request or obtain the client device data. In one example, a graphical user interface may be displayed on a display screen of the client device 110 that, when selected, may cause the client device 110 to send the client device data to the server computer system 120. As another example, the server computer system 120 may request the client device data from the client device 110 and this may be done when the mobile application is opened on the client device 110.

In one or more embodiments, the client device data may include geolocation data. Geolocation data may be obtained from the client device 110. Example geolocation data includes global navigation satellite system (GNSS) (e.g. global positioning satellite (GPS)) determined geo-coordinates or readings. Other examples include WiFi or cellular based location data.

Detection of the trigger condition may be made using the geolocation data. For example, the server computer system 120 may analyze the geolocation data to identify that the client device 110 is in a foreign country having a foreign currency.

In one or more embodiments, the geolocation data may be analyzed to determine a change in location of the client device 110. For example, the server computer system 120 may determine the trigger condition based on determining that the geolocation data identifies a change in location of the client device 110.

In one or more embodiments, detecting the trigger condition may be based on geolocation data and a database of international travel departure locations. International travel departure locations may include, for example, international airports, international train stations, ship ports, etc. That is, the trigger condition may be detected once the client device 110 is determined to be in a foreign country having a foreign currency.

In one or more embodiments, the location of the client device 110 may be inferred from transaction data available to the server computer system 120 such as for example credit card processing data, bank debit transaction data, third party merchant transaction data, airline or train check-in data or baggage fee transactions, or other such sources. The transaction data may be analyzed to determine or estimate the location of the client device 110. For example, the transaction data may include credit or debit-based purchases of goods or services and data indicating the merchant. Example transactions may include rental car payment or deposit return, purchase from a retailer at a specific location, or payment of a travel-related expense, such as an airline or train baggage fee.

Other types of client device data may be used to detect the trigger condition. For example, in one or more embodiments, calendar data may be used to detect the trigger condition. The calendar data may be received from the client device 110 and may identify, for example, a scheduled flight, hotel, etc. As another example, the client device data may include an email or text message relating to travel or a notification from a travel-related application resident on the client device 110 such as for example a mobile application associated with a particular airline.

It will be appreciated that the trigger condition may be detected based on multiple types of client device data. For example, in one or more embodiments, detecting the trigger condition may be based on a calendar data, geolocation data provided by the mobile device, and transaction data with regard to foreign retailers, etc.

The client device data may be real-time data regarding the location of the client device 110 or from which location the might be inferred, or it may be data received during or prior to the registered user's travel in some cases. For example, calendar data or transaction data may be obtained prior to a trip, such as for example at the time of booking. The server computer system 120 may store this data in a database and may monitor this data until the scheduled trip has been initiated or has taken place. When it has been determined that the scheduled trip has been initiated or has taken place, the server computer system 120 may detect the trigger condition.

In one or more embodiments, the detection of the trigger condition may be initiated by the user of the client device 110. For example, the user of the client device 110 may open a mobile application associated with the server computer system 120 and may select a selectable option for requesting that a digital token be generated and this may initiate the method 500. In this example, the user of the client device 110 may be travelling to a foreign country and may wish for the server computer system 120 to generate a digital token to make payments while travelling in the foreign country.

The method 500 includes identifying at least one available computer network for performing one or more operations based at least on the client device data (step 520).

The at least one available computer network may include one or more computer networks that are available for performing one or more operations. In one or more embodiments, a plurality of computer networks may be available and the server computer system 120 may identify at least one of the computer networks as being available to perform one or more operations based on network bandwidth. For example, the server computer system 120 may obtain network usage data from a network usage analyzer and may analyze the network usage data to identify one of the computer networks as available to perform one or more operations.

In one or more embodiments, the client device data may identify a geolocation of the client device 110. The geolocation of the client device 110 may identify that the client device 110 is in a foreign country.

In one or more embodiments, the server computer system 120 may determine a foreign currency based on the geolocation of the client device 110 and may identify the at least one computer network based on the foreign currency. For example, the server computer system 120 may maintain a database that includes a list of foreign countries that require foreign currency. The database may be structured as or may include a lookup table that includes a list of all available computer networks for each particular foreign country.

In one or more embodiments, the server computer system 120 may identify one of the available computer networks for a particular foreign country as a preferred or recommended computer network. For example, the server computer system 120 may engage a machine learning module that may be trained using training data that identifies foreign credit card transactions, foreign exchange rates, and foreign exchange rate fees charged to complete the foreign credit card transaction. The training data may also identify the computer network used to complete each foreign credit card transaction. In this manner, the machine learning module may be trained to identify a preferred or recommended computer network and this may be based on identifying which computer network resulted in the lowest foreign exchange rate fees.

In one or more embodiments, the server computer system 120 may identify or may define a hierarchy of the available computer networks. For example, the server computer system 120 may select one of the computer networks as the preferred or recommended computer network and may identify one or more of the other computer networks as also being available to perform the one or more operations.

In one or more embodiments, the at least one available computer network may include at least one payment network or at least one payment rail. For example, the at least one payment network may include one or more of the Visa™, Mastercard™, or American Express™ payment networks.

The method 500 includes sending a notification for output on a display screen of a client device, the notification presenting a selectable option for selecting the at least one available computer network (step 530).

The server computer system 120 generates the notification and sends the notification to the client device 110. The client device 110 receives the notification and performs operations to display the notification on the display screen thereof.

The notification includes the at least one computer network identified during step 520.

In embodiments where the server computer system 120 identifies one of the computer networks as the preferred or recommended computer network, for example by way of the machine learning module, the notification may display only the preferred or recommended computer network. In embodiments where the server computer system 120 identifies one of the computer networks as the preferred or recommended computer network and also identifies one or more of the other computer networks as also being available, the notification may list the computer networks and may identify one of the computer networks as being the preferred or recommended computer network. The list of the computer network may be ordered such that the preferred or recommended computer network is displayed at the top of the list, the second preferred or recommended computer network is displayed second on the list, etc.

The notification includes a selectable option to select the at least one available computer network. In embodiments where only one computer network is displayed, for example when the notification includes the recommended or preferred computer network, the selectable option is displayed adjacent to the computer network. In embodiments where multiple computer networks are displayed, a selectable option may be displayed adjacent to each computer network allowing the user to easily select one of the plurality of available computer networks.

The user of the client device 110 may select the selectable option by performing, for example, a tap gesture at a location on the display screen that corresponds to the location of the selectable option.

The method 500 includes receiving, from the client device, an indication of selection of the selectable option for selecting the at least one available computer network (step 540).

Responsive to the user selecting the selectable option, the client device 110 may send an indication of selection of the selectable option to the server computer system 120. In embodiments where the notification displays multiple computer networks, the indication may identify the computer network that has been selected.

The method 500 includes generating a digital token for communicating instructions to perform one or more operations using the at least one available computer network (step 550).

Responsive to receiving the indication of selection of the at least one computer network, the server computer system

120 generates a digital token for communicating instructions to perform one or more operations using the selected computer network.

In one or more embodiments, the digital token may be generated to communicate instructions that are compliant with one or more communication protocols associated with the selected computer network. For example, the selected computer network may communicate using a first communication protocol and as such the digital token may be generated to communicate data using the first communication protocol.

In one or more embodiments, the digital token may include a payment token. In these embodiments, when generating the digital token, the server computer system 120 may generate a tokenized primary account number (PAN) for the digital token. Specifically, the server computer system 120 may generate a sixteen-digit PAN for the digital token and may tokenize the PAN to generate the digital token. Tokenization may include replacing the PAN with a series of randomly-generated numbers.

In one or more embodiments, the server computer system 120 may request the digital token from the computer network. For example, the computer network may include the VISA™ payment network or payment rail and as such the server computer system 120 may send a request to the VISA™ payment network for the digital token. The server computer system 120 may then receive the requested digital token from the computer network.

The digital token may be associated with an account of the user and this may be identified through authentication of the client device 110 at the server computer system 120. For example, the user may operate the client device 110 to open a mobile application provided by the server computer system 120 and may be prompted to authenticate by entering, for example, a username and a password. Responsive to successful authentication, the server computer system 120 may identify one or more accounts associated with the authenticated user and may associate the digital token with the one or more accounts.

The method 500 includes provisioning the client device with the digital token to enable the client device to selectively communicate instructions to perform the one or more operations using the at least one available computer network (step 560).

The digital token may be stored by the client device 110 and may be used by the client device 110 to communicate instructions to one or more computer systems, computer server systems, or computing devices to perform one or more operations using the at least one available computer network.

In one or more embodiments, such as for example when the digital token includes a payment token, the server computer system 120 may provision the client device 110 with the digital token by provisioning a digital wallet resident on the client device 110 with the digital token. For example, the client device 110 may include a digital wallet such as for example Apple™ Pay or Google™ Pay and the server computer system 120 may provision the digital wallet with the digital token.

The digital wallet stores the digital token on the client device 110 where it can now be used to communicate instructions to perform one or more operations using the at least one available computer network.

In embodiments where the digital token includes the payment token, the digital wallet may use the digital token to allow the client device 110 to make a payment. For example, the digital wallet may use the payment token to allow the client device 110 to make a payment. This configuration may include configuring the device for Host Card Emulation (HCE) in manners known to skilled persons. For example, Apple™ Pay may be configured. Payments may be made using the client device 110 in manners known to skilled persons. Briefly put, the client device 110 may be used to make an NFC payment at a point-of-sale ("POS") system of a merchant. The payment token may communicate instructions to the POS system to perform one or more operations. The one or more operations may include communicating with the selected computer network to authorize and receive clearance of a transaction. The selected computer network may communicate with a merchant bank or an acquirer and an issuer bank in order to settle the transaction.

In manners described herein, the digital token is used to send instructions to cause the POS system to settle the transaction using the selected computer network. In embodiments where the selected computer network includes a payment network, the digital token is used to reduce or minimize foreign exchange rate fees as the digital token was generated for the payment network that was identified as being available in the foreign country and that was selected as having the lowest foreign exchange rate fees.

In one or more embodiments, the digital token may be generated and provisioned on the client device 110 such that the digital token may be used to make payment using a credit card. Put another way, the digital token may represent a credit card account that may be used to complete payments within the foreign country using the selected payment network.

In one or more embodiments, the digital token may be generated and provisioned on the client device 110 such that the digital token may be used to make payment using a stored value card or a prepaid credit card. Put another way, the digital token may represent a prepaid credit card account that may be used to complete payments within the foreign country using the selected payment network. In these embodiments, the server computer system 120 may cause the client device 110 to prompt the user to select a denomination for the prepaid credit card in the foreign currency and the server computer system 120 may communicate with the selected payment network to load the prepaid card with the selected denomination.

In one or more embodiments described herein, the digital token may include a temporary digital token. For example, the digital token may expire and the expiration date may be set by the server computer system 120 or the user based on when the user (and thus the client device 110) is going to leave the foreign country. Expiration of the digital token may result in increased security for the user as the digital token may be automatically disabled from the client device 110 on the expiration date. In examples where the user loses the client device 110 and returns home without the client device 110, the digital token is disabled on the expiry date and this prevents or minimizes the risk of fraudulent transactions being completed by someone other than the owner of the client device 110.

As another example, the digital token may only be available to communicate the instructions to perform the one or more operations using the at least one available computer network when the trigger condition is satisfied. Put another way, the digital token may be disabled when it is determined that the trigger condition is no longer satisfied.

Figure 6:
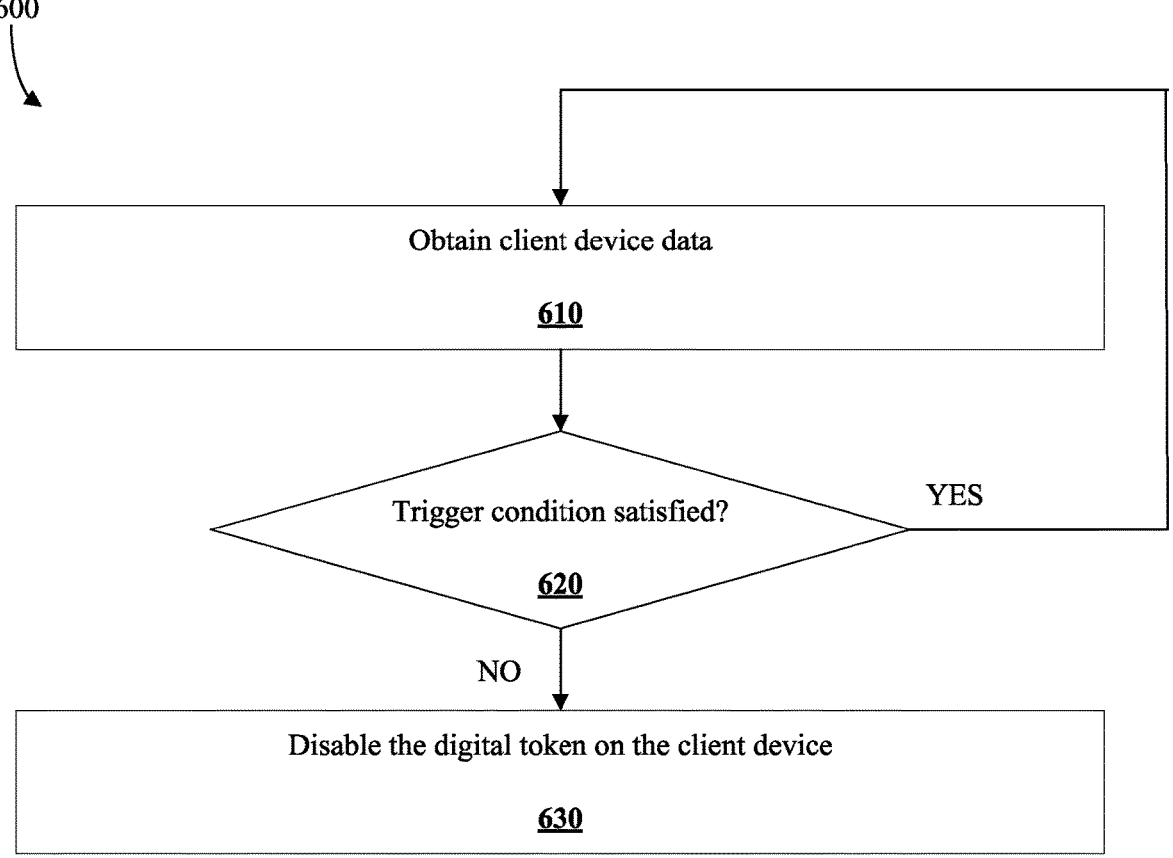
FIG. 6 is a flowchart showing operations performed by a server computer system for disabling a digital token according to an embodiment.

Reference is made to FIG. 6, which illustrates, in flowchart form, a method 600 for disabling the digital token. The method 600 may be implemented by a computing device having suitable processor-executable instructions for causing the computing device to carry out the described operations. The method 600 may be implemented, in whole or in part, by the server computer system 120. It will be appreciated that some of the operations may be offloaded to the client device 110.

The method 600 includes continuously obtaining the client device data (step 610).

The server computer system 120 may periodically obtain the client device data from the client device 110. For example, the server computer system 120 may poll the client device 110 for the geolocation data and this may be done every minute, every hour, every day, etc.

The method 600 includes determining, based on the client device data, that the trigger condition is no longer satisfied (step 620).

The server computer system 120 may analyze the client device data to determine that the trigger condition remains satisfied and as such the server computer system 120 may continue to obtain client device data.

The server computer system 120 may analyze the client device data to determine that the trigger condition is no longer satisfied. For example, the trigger condition may include determining that the client device 110 is located in a foreign country with a foreign currency. The server computer system 120 may obtain client device data and may determine that the client device 110 is no longer in the foreign country and as such may determine that the trigger condition is no longer satisfied.

The method 600 includes disabling the digital token on the client device such that the digital token cannot communicate the instructions to perform the one or more operations (step 630).

Responsive to determining that the trigger condition is no longer satisfied, the server computer system 120 may disable the digital token on the client device 110. For example, the server computer system 120 may perform operations to remove the digital token from the digital wallet of the client device 110. As another example, the server computer system 120 may deactivate the digital token. The digital token is disabled such that it cannot communicate instructions to perform the one or more operations.

In one or more embodiments, when monitoring the client device data, the server computer system 120 may detect at least one another trigger condition. For example, the server computer system 120 may detect at least one another trigger condition that includes identifying a second geolocation of the client device. The second geolocation may be a different geolocation than the geolocation that was used to detect the trigger condition during step 510 of the method 500 described herein. In these embodiments, it may be determined that the client device 110 is now located in a different foreign country that requires a different foreign currency. In response to detecting the at least one another trigger condition, the server computer system 120 may perform the operations of the method 500 to identify at least one different available computer network for performing one or more operations based at least on the client device data, send, via the communications module, a notification for output on the display of the client device, the notification presenting a selectable option for selecting the at least one different available computer network, receive, via the communications module and from the client device, an indication of selection of the selectable option for selecting the at least one different available computer network, generate a digital token for communicating instructions to perform one or more operations using the at least one different available computer network, and provision the client device with the digital token to enable the client device to selectively communicate instructions to perform the one or more operations using the at least one different available computer network.

In manners described herein, the server computer system 120 may provision the client device 110 with one or more digital tokens that may be used to complete payments using foreign currency in each foreign country the client device 110 is located in. For example, the server computer system 120 may provision the client device 110 with a VISA™ payment token when the client device 110 is in a foreign country where VISA™ is the recommended payment network or payment rail. When the client device 110 travels to a different foreign country where Mastercard™ is the recommended payment network, the server computer system 120 may provision the client device 110 with a Mastercard™ payment token. This allows a user to toggle between different network processors within the digital wallet of the client device 110 without requiring the user to open new accounts. Rather, each digital token that is generated for the user is associated with a single account that is in a home currency for the user. As such, foreign exchange rate costs are minimized.

Although in embodiments described herein utilize geolocation data to identify the one or more computer networks, it will be appreciated that in one or more embodiments the user of the client device 110 may select a particular foreign currency for the digital token and the server computer system 120 may perform operations to select a particular computer network for the digital token based on the foreign currency.

Figure 7:
FIG. 7 is an example notification displayed on a display of a client device according to an embodiment.
Figure 8:
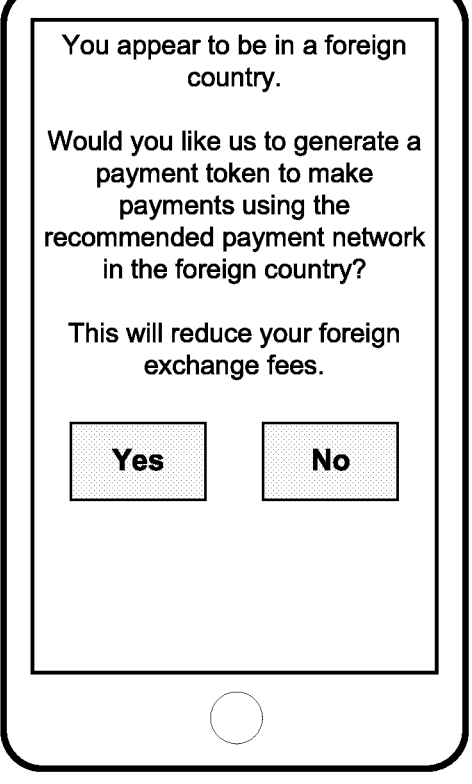
FIG. 8 is another example notification displayed on a display of a client device according to an embodiment.

Example notifications sent for output on the display of the client device 110 in accordance with embodiments described herein are shown in FIGS. 7 and 8. As shown in FIG. 7, the notification informs the user of the client device 110 that they appear to be in a foreign country. The notification asks the user if they would like the server computer system 120 to generate a digital token to use a recommended computer network in the foreign country. Selection of "YES" may cause the server computer system 120 to perform operations to provision the client device 110 with the digital token in manners similar to that described herein.

As shown in FIG. 8, the notification informs the user of the client device 110 that they appear to be in a foreign country. The notification asks the user if they would like the server computer system 120 to generate a payment token to use a recommended payment network in the foreign country. Selection of "YES" may cause the server computer system 120 to perform operations to provision the client device 110 with the payment token in manners similar to that described herein.

Figure 9:
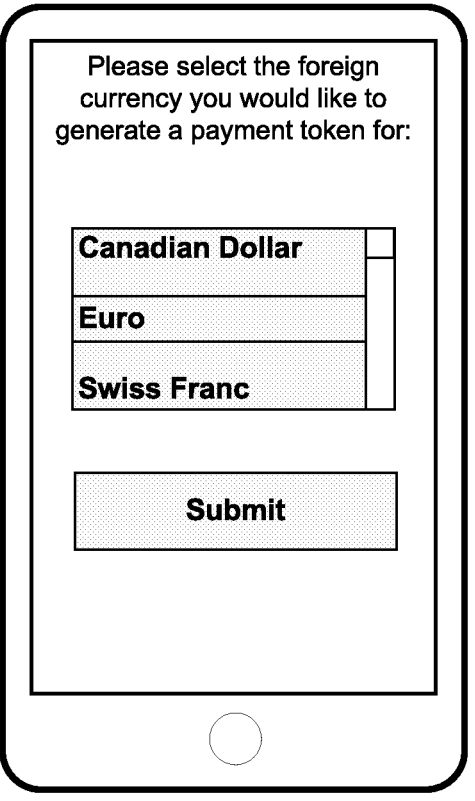
FIG. 9 is an example graphical user interface for selecting a foreign currency for a digital token according to an embodiment.

As mentioned, in one or more embodiments the user of the client device 110 may request that a digital token be generated. An example graphical user interface for requesting that a digital token be generated is shown in FIG. 9. As can be seen, the graphical user interface includes a list of foreign currencies and prompts a user to select one of the foreign currencies. The list of foreign currencies may include a list of foreign currencies that are available for a payment token. The user may select one of the foreign currencies and may select a submit button. In response, the server computer system 120 may perform operations to provision the client device 110 with the payment token in manners similar to that described herein.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A server computer system comprising:

a communications module;

at least one processor coupled to the communications module; and a memory coupled to the at least one processor, the memory storing processor-executable instructions which, when executed by the at least one processor, configure the at least one processor to:

detect a trigger condition based at least on client device data;

analyze the client device data to identify a geolocation of a client device, wherein the geolocation is associated with a region;

obtain network usage data from a network usage analyzer;

identify at least one available computer network for performing one or more operations based at least on the region and the network usage data;

send, via the communications module, a notification for output on a display of the client device, the notification presenting a selectable option for selecting the at least one available computer network;

receive, via the communications module and from the client device, an indication of selection of the selectable option for selecting the at least one available computer network;

generate a digital token compliant with a communication protocol of the selected computer network, the digital token comprising authentication data that obviates transmission of persistent credentials by the client device for performing the one or more operations using the at least one available computer network; and provision the client device with the digital token to enable the client device to selectively communicate the instructions to perform the one or more operations using the at least one available computer network.

2. The server computer system of claim 1, wherein the server computer system further comprises a machine learning module and wherein the instructions, when executed by the at least one processor, further configure the at least one processor to:

engage the machine learning module to identify the at least one available computer network for performing the one or more operations based at least on the region and the network bandwidth.

3. The server computer system of claim 1, wherein the instructions, when executed by the at least one processor, further configure the at least one processor to:

determine the trigger condition based, at least in part, on determining that geolocation data identifies a change in location of the client device.

4. The server computer system of claim 1, wherein the instructions, when executed by the at least one processor, further configure the at least one processor to:

perform a lookup using the client device data to identify the at least one available computer network.

5. The server computer system of claim 1, wherein the instructions, when executed by the at least one processor, further configure the at least one processor to:

provision a digital wallet resident on the client device with the digital token.

6. The server computer system of claim 1, wherein the at least one available computer network includes at least one payment network.

7. The server computer system of claim 1, wherein the digital token includes a temporary digital token.

8. The server computer system of claim 1, wherein the digital token is only available to communicate the instructions to perform the one or more operations using the at least one available computer network when the trigger condition is satisfied.

9. The server computer system of claim 1, wherein the instructions, when executed by the at least one processor, further configure the at least one processor to:

continuously obtain the client device data;

determine, based on the client device data, that the trigger condition is no longer satisfied; and responsive to determining that the trigger condition is no longer satisfied, disable the digital token on the client device such that the digital token cannot communicate the instructions to perform the one or more operations.

10. The server computer system of claim 9, wherein the instructions, when executed by the at least one processor, further configure the at least one processor to:

detect at least another trigger condition based at least on the client device data;

identify at least one different available computer network for performing the one or more operations based at least on the client device data;

send, via the communications module, a notification for output on the display of the client device, the notification presenting a selectable option for selecting the at least one different available computer network;

receive, via the communications module and from the client device, an indication of selection of the selectable option for selecting the at least one different available computer network;

generate a digital token compliant with a communication protocol of the at least one different available computer network, the digital token comprising authentication data that obviates transmission of persistent credentials by the client device for performing the one or more operations using the at least one different available computer network; and provision the client device with the digital token to enable the client device to selectively communicate the instructions to perform the one or more operations using the at least one different available computer network.

11. The server computer system of claim 10, wherein the trigger condition includes identifying a first geolocation of the client device and the at least another trigger condition includes identifying a second geolocation of the client device that is different than the first geolocation.

12. The server computer system of claim 1, wherein when generating the digital token, the instructions, when executed by the at least one processor, further configure the at least one processor to:

generate a tokenized primary account number for the digital token.

13. The server computer system of claim 1, wherein the instructions, when executed by the at least one processor, further configure the at least one processor to:

determine a foreign currency based on the geolocation of the client device; and identify the at least one available computer network based on the foreign currency.

14. A computer-implemented method comprising:

detecting a trigger condition based at least on client device data;

analyzing the client device data to identify a geolocation of a client device, wherein the geolocation is associated with a region;

obtaining network usage data from a network usage analyzer;

identifying at least one available computer network for performing one or more operations based at least on the region and the network usage data;

sending a notification for output on a display of the client device, the notification presenting a selectable option for selecting the at least one available computer network;

receiving, from the client device, an indication of selection of the selectable option for selecting the at least one available computer network;

generating a digital token compliant with a communication protocol of the selected computer network, the digital token comprising authentication data that obviates transmission of persistent credentials by the client device for performing one or more operations using the at least one available computer network; and provisioning the client device with the digital token to enable the client device to selectively communicate the instructions to perform the one or more operations using the at least one available computer network.

15. The computer-implemented method of claim 14, wherein the method further comprises:

determining the trigger condition based, at least in part, on determining that geolocation data identifies a change in location of the client device.

16. The computer-implemented method of claim 14, further comprising:

performing a lookup using the client device data to identify the at least one available computer network.

17. The computer-implemented method of claim 14, wherein the digital token is only available to communicate the instructions to perform the one or more operations using the at least one available computer network when the trigger condition is satisfied.

18. The computer-implemented method of claim 14, further comprising:

continuously obtaining the client device data;

determining, based on the client device data, that the trigger condition is no longer satisfied; and responsive to determining that the trigger condition is no longer satisfied, disabling the digital token on the client device such that the digital token cannot communicate the instructions to perform the one or more operations.

19. The computer-implemented method of claim 18, further comprising:

detecting at least another trigger condition based at least on the client device data;

identifying at least one different available computer network for performing the one or more operations based at least on the client device data;

sending a notification for output on the display of the client device, the notification presenting a selectable option for selecting the at least one different available computer network;

receiving, from the client device, an indication of selection of the selectable option for selecting the at least one different available computer network;

generating a digital token compliant with a communication protocol of the at least one different available computer network, the digital token comprising authentication data that obviates transmission of persistent credentials by the client device for performing the one or more operations using the at least one different available computer network; and provisioning the client device with the digital token to enable the client device to selectively communicate the instructions to perform the one or more operations using the at least one different available computer network.

20. A non-transitory computer readable storage medium comprising computer-executable instructions which, when executed, configure at least one processor to:

detect a trigger condition based at least on client device data;

analyze the client device data to identify a geolocation of a client device, wherein the geolocation is associated with a region;

obtain network usage data from a network usage analyzer;

identify at least one available computer network for performing one or more operations based at least on the region and the network usage data;

send, via a communications module, a notification for output on a display of the client device, the notification presenting a selectable option for selecting the at least one available computer network;

receive, via the communications module and from the client device, an indication of selection of the selectable option for selecting the at least one available computer network;

generate a digital token compliant with a communication protocol of the selected computer network, the digital token comprising authentication data that obviates transmission of persistent credentials by the client device for performing one or more operations using the at least one available computer network; and provision the client device with the digital token to enable the client device to selectively communicate the instructions to perform the one or more operations using the at least one available computer network.

\* \* \* \* \*